United States Patent Office 3,043,813
Patented July 10, 1962

3,043,813
POLYMER OF ALKENYL EPOXYCYCLO-
PENTYL ETHERS
John R. Kilsheimer, South Charleston, and Benjamin Phillips and Paul S. Starcher, Charleston, W. Va., assignors to Union Carbide Corporation, a corporation of New York
No Drawing. Filed Oct. 3, 1958, Ser. No. 765,044
11 Claims. (Cl. 260—80.5)

This invention relates to compositions comprising polymerized compounds. More particularly, this invention relates to compositions comprising, as characteristic components, unsaturated ethers of epoxycyclopentyl alcohols.

One of the primary objects of this invention is to provide a new series of resins that are cross-linkable at various stages of processing to yield three-dimensional structures possessing desirable physical properties. It is known that low molecular weight resins usually possess low tensile strengths while, at the same time, possessing desirable characteristics such, for example, as ease of handling and ease of fabrication, whereas the high molecular weight resins, and particularly the high molecular weight, three-dimensional structures, are strong but relatively infusible, insoluble, and difficult to fabricate. The present invention provides low molecular weight resins capable of cross-linking to produce high molecular, three-dimensional structures having in combination advantageous properties of both the low molecular weight resins and the high molecular weight resins.

Polymers that are infusible and insoluble have great commercial utility, for such products as shaped articles and coatings made therefrom have substantially complete resistance to all ordinary solvents and they are not affected adversely by heat except at extreme temperatures at which charring occurs. Considerable difficulty is encountered, however, in manufacturing articles from infusible and insoluble resins.

In accordance with the present invention, compositions are provided that are low in molecular weight and thus are easy to fabricate and which can be later cross-linked into a high molecular weight, three-dimensional structure which is substantially infusible and insoluble. Such compositions are formed, according to the invention, by polymerizing a monomer containing dissimilar polymer-forming groups in the molecule with itself or with another polymerizable monomer.

Compounds containing the dissimilar polymer-forming groups include the alkenyl ethers of 2,3-epoxycyclopentanol which contain from two through four carbon atoms in the alkenyl group. The alkenyl ethers of 2,3-epoxy-cyclopentanol may be represented by the general formula:

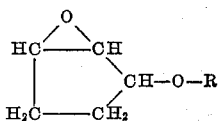

wherein R represents an alkenyl group containing from two through four carbon atoms such as, for example, a vinyl, allyl or crotyl group.

As may be readily observed, the monomers employed in forming the compositions of the invention contain two dissimilar polymer-forming groups, namely, an epoxide group and an olefinic group. These two dissimilar groups form polymers by entirely different reaction mechanisms. The compounds can be subjected to conditions whereby polymerization occurs through one group to the exclusion of polymerization through the second group. The resulting polymer can then be further polymerized under different conditions through the unaffected second group so that an infusible and insoluble polymer is formed.

The dissimilarity of polymer-forming groups permits control over polymer formation with the production of polymers having a versatility of properties heretofore unobtainable.

The compositions of this invention, while fulfilling the requirements of many other desirable uses, are particularly adapted for use as protective coatings suitable for industrial applications as paints, paper, leather, for coating, impregnating or sizing cloth, laminates and linings for the inside of cans and containers.

The polymer compositions of this invention are directed to compositions comprising, as characteristic components, the unsaturated ethers of 2,3-epoxycyclopentanol. More particularly, the polymer compositions of this invention are directed to compositions comprising, as characteristic components, the alkenyl ethers of 2,3-epoxycyclopentanol characterized by the following general formula:

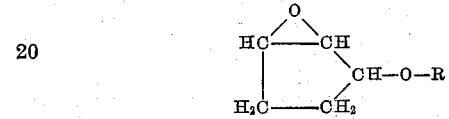

wherein R represents an alkenyl group containing from two through four carbon atoms.

Another embodiment of this invention is directed to copolymer compositions comprising the product of polymerization of a mixture containing (a) a polymerizable unsaturated monomer containing at least one polymerizable group, and (b) a compound represented by the formula:

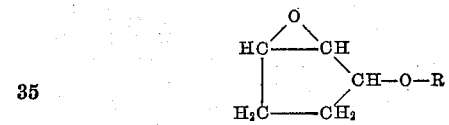

wherein R represents an alkenyl group containing from two through four carbon atoms.

One of the modifications of this embodiment of the invention is directed to copolymer compositions comprising the product of polymerization of, (a) a vinyl ester of an inorganic acid such as vinyl chloride, vinyl bromide, vinyl fluoride, acrylonitrile and methacrylonitrile, and (b) a compound represented by the formula:

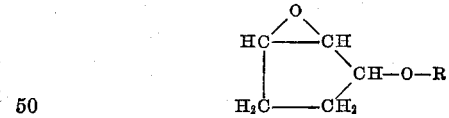

wherein R represents an alkenyl group containing from two through four carbon atoms.

Another modification of this embodiment of the invention is directed to copolymer compositions comprising the product of polymerization of a mixture containing, (a) a vinyl ester of an aliphatic monocarboxylic acid, and (b) a compound represented by the formula:

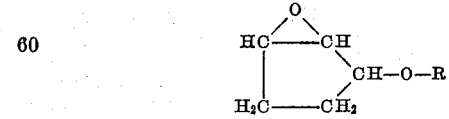

wherein R represents an alkenyl group containing from two through four carbon atoms.

Typical vinyl esters of aliphatic monocarboxylic acids include vinyl acetate, vinyl butyrate, vinyl chloracetate, vinyl formate and vinyl caproate.

Another important modification of this embodiment of the invention is directed to compositions of matter comprising the product of polymerization of a mixture containing, (a) a vinylidene halide such as vinylidene chloride, vinylidene bromide and vinylidene fluoride, and (b) a compound represented by the formula:

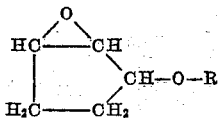

wherein R represents an alkenyl group containing from two through four carbon atoms.

Still another modification of this embodiment of the invention is directed to compositions of matter comprising the product of polymerization of a mixture containing, (a) an alkyl ester of an unsaturated aliphatic monocarboxylic acid such as methyl acrylate, methyl methacrylate and ethyl acrylate; the unsaturated aliphatic monocarboxylic acids such as acrylic acid and the alpha-alkyl substituted acrylic acids, and (b) a compound represented by the formula:

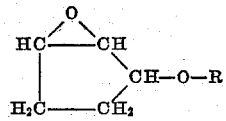

wherein R represents an alkenyl group containing from two through four carbon atoms.

Other groups of polymerizable monomeric substances which can be advantageously employed to copolymerize with the alkenyl ethers of 2,3-epoxycyclopentanol herein disclosed include monomers having a conjugated system of ethylene double bonds such as, for example, 1,3-butadiene, isoprene, 2,3-dimethyl-1,3-butadiene, 1-acetoxybutadiene, piperylene, 2-cyano-1,3-butadiene, 2-methoxy-1,3-butadiene and 2-fluoro-1,3-butadiene. Still other groups of polymerizable monomeric substances can be employed and include acetylene, alkyl acetylenes and dialkyl acetylenes as well as dimers and trimers of acetylene containing one or more acetylenic linkages or mixed olefinic and acetylenic linkages.

Another particularly important modification of this embodiment of the invention is directed to compositions of matter comprising the product of polymerization of a mixture containing, (a) an unsaturated aliphatic ester of a saturated aliphatic polybasic acid; an unsaturated aliphatic ester of an unsaturated aliphatic polybasic acid or an unsaturated aliphatic ester of a dibasic aromatic acid such as, for example, the divinyl, diallyl and dimethyallyl esters of oxalic, maleic, malonic, critric, and tartaric acids; the divinyl, diallyl and dimethyallyl esters of phthalic, isophthalic, terephthalic acids and naphthalene dicarboxylic acids, and (b) a compound represented by the formula:

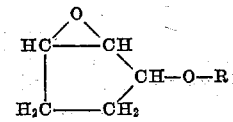

wherein R represents an alkenyl group containing from two through four carbon atoms.

Still other classes of polymerizable monomers include the unsaturated aliphatic ethers of saturated polyhydric alcohols such as the vinyl, allyl and methyallyl di-ethers of ethylene glycol, trimethylene glycol and polyethers of glycerol, mannito, sorbitol and the like; the unsaturated aliphatic esters of polyhydric alcohols such as the acrylic, methacrylic polyesters of ethylene glycol and organic olefinically unsaturated compounds containing one or more silicon atoms such as vinyl triethoxy silane.

The proportions of reactive monomers suitable for use in preparing the novel copolymers of this invention will vary over a wide range depending on the particular reactants and the type of product desired. It is possible to make a complete range of polymers from substantially rigid to very flexible by proper selection of the ratio of reacting monomers. These polymers find utility for applications such as floor coverings, wire coatings, plastic pipe, upholstery, raincoats, surface coatings of all types and films for the packaging of food.

The polymerization of the epoxy monomers herein disclosed is readily accomplished by any suitable means. The polymerization reaction is preferably accomplished by heating one or more epoxy-containing monomers with one or more polymerizable ethylenically unsaturated monomers in the presence of a polymerization catalyst. The polymerization reaction can be carried out in solution, emulsion, suspension or bulk systems. If solvents are employed, they can be solvents for the monomers and polymer, or they may be solvents for the monomers and non-solvents for the polymers. Examples of solvents useful in a solution polymerization technique are acetone, tetrahydrofuran, dimethylformamide, benzene and the like.

In a typical solvent polymerization, a solvent such as acetone is charged to an autoclave and then the epoxy-containing monomer and polymerization catalyst are added. The autoclave is then flushed out with nitrogen or other inert gas and sealed. When vinyl chloride is selected as the coreacting monomer, it is then passed into the autoclave. The reaction mixture is then brought up to temperature and the temperature is maintained until polymerization is substantially complete. Substantially complete polymerization of the reactive monomers can ordinarily be achieved in a period of time varying from about 16 to about 40 hours.

Generally, the solids content of the autoclave varnish containing the copolymerized resins may run as high as 40 percent solids. This provides an economic advantage in that less solvent is required to maintain a satisfactory viscosity.

If it is desired to carry out the polymerization reaction in an emulsion system, water, an emulsifier, and a water-soluble persulfate catalyst are charged to an autoclave. The reactive monomers are then charged to the autoclave. In the case of a vinyl chloride polymerization, the epoxy monomer is charged first, the system is then flushed out with an inert gas and then the vinyl chloride is added. Thereafter, the reaction mixture is brought to temperature and the temperature is maintained until polymerization is substantially complete. In a similar manner, the polymerization of the reactive monomers can be carried out in a suspension polymerization system.

The catalyst used in effecting the polymerization reaction can be either inorganic or organic in nature and may be exemplified by acetyl peroxide, benzoyl peroxide, benzoyl acetyl peroxide, tertiary-butyl hydroperoxide, tertiary-butyl perbenzoate, cumene hydroperoxide, tertiary-butyl peracetate, potassium persulfate, azo bisisobutyronitrile and the like. The amount of catalyst required is not narrowly critical and can vary over a wide range. In general, the catalyst concentration will vary from 0.1 percent to 5.0 percent by weight of the material being polymerized.

The temperature employed in the polymerization likewise is not narrowly critical and can vary over a considerable range depending upon the monomer and the catalyst being employed. In most cases, the temperature will vary from 0° C. to about 150° C. Preferred temperatures range from 40° C. to 60° C. Atmospheric, superatmospheric or subatmospheric pressures may be utilized. In practice, the polymerization is effected through the olefinic groups and later curing of the resin to a three-dimensional structure can be effected through the epoxide groups with the aid of heat or various cross-linking catalysts. However, the reverse procedure of first effecting the epoxide polymerization, and later curing through the olefinic groups, may also be employed.

Unreacted materials are separated from the polymer by known methods such as solvent extraction, precipitation, distillation, filtration and the like. The polymer resin can then be worked up in any suitable manner.

Other materials such as coloring agents, pigments and the like may be incorporated into the resins as desired.

The epoxy-containing polymer-forming monomers are readily prepared by the reaction of peracetic acid upon a selected unsaturated ether of 2-cyclopentenol as described and claimed in copending application of B. Phillips and P. S. Starcher, Serial No. 600,387, filed July 27, 1956.

As hereinbefore disclosed, the polymer and copolymer compositions of this invention are suitable for use in many industrial applications. It has been found that the polymer and copolymer compositions of this invention are admirably adapted for use as surface coatings.

It is generally recognized that copolymers of vinyl chloride with various esters, such as vinyl acetate, ethyl acrylate and the like have been employed for many years as materials of merit for surface coatings use because of their resistance to deterioration by inorganic acids and bases, alcohols, mineral oils, many greases and other agents which tend to shorten the effective life of protective coatings. In spite of these many distinct advantages, however, the use of these materials is limited to some extent by certain difficulties in application and inherent weaknesses usually exhibited at elevated temperatures. Also, the application of thermoplastic vinyl chloride copolymers from solutions is made somewhat difficult due to the fact that fairly high molecular weight resins, i.e., resins with reduced viscosities of 0.40 and above, must be used if good film toughness is to be achieved. As a result, resin solids concentrations are necessarily low at customary dipping or spraying viscosities. Recent technical developments, however, have made it possible to overcome these difficulties by applying the copolymer coatings from dispersions but this method, in turn, poses difficulty in coating of metal sheets because of the poor adhesion of the coatings to the metal.

It has been discovered that virtually all of these disvantages can be overcome through the use of the coating compositions of this invention.

The new polymeric materials of this invention can be applied to an article to be coated, such as a metal container, by dissolving the polymer in a suitable solvent. Solvents which are suitable include aliphatic ketones and aromatic hydrocarbons such as methyl isobutyl ketone, xylene, toluene and the like.

These new polymeric coating materials provided by this invention provide the advantage over commercial thermoplastic coating materials since these resins can be cured to hard, insoluble, three-dimensional films by heat alone or the combination of heat and curing agents. The rate of curing and the completeness of the cure, however, will vary somewhat with the different resins. Generally speaking, the higher the molecular weight and epoxide content, the lower the required baking schedule.

When it is desired to employ cross-linking or curing agents, it has been discovered that the coating compositions can be effectively cured in the presence of any polybasic inorganic or organic acid or polycarboxylic acid. Among the curing agents which have been found suitable are polybasic organic and inorganic acids such as phosphoric acid, aconitic acid, n-butyl phosphoric acid, citric acid, tricarballylic acid, oxalic acid, succinic acid, glutaric acid, adipic acid and the like. It has further been discovered that phosphoric acid is an excellent curing agent for curing unpigmented finishes while aconitic acid has been used most successfully with pigmented finishes. Additionally, other curing agents such as the polyphenols and polyamines and mixtures thereof can be employed to cure the resins.

The following examples further describe and illustrate the invention. In these examples, elemental analyses, wherever recorded, were conducted in accordance with heretofore standardized procedures of quantitative analyses for organic materials. Also, in those examples exhibiting copolymers, quantitative analyses for the constituent parts or mers of the particular copolymer concerned were conducted by applying the values obtained from an elemental analysis of the copolymer to the corresponding mass balance equations representing the formation of the copolymer and solving for unknowns. The determinations of solubilities or insolubilities of the final, cast resins were made by weighing a dry sample before and after agitating it with a solvent. Reduced viscosities, as they appear in the examples, were found by preparing a dilute solution, of the order of about 0.2 percent of a product sample in a suitable solvent, such as, benzene, cyclohexanone, dimethyl-formamide and, the like, measuring the viscosity of the solution and of the solvent alone at a given temperature about 30° C. and applying the following formula:

$$\text{Reduced viscosity} = \frac{\left(\frac{Nc}{No}\right) - 1}{C}$$

wherein, $Nc$ is the viscosity in centipoises or like unit of measure of the solution, $No$ is the viscosity in the same unit of measure as $Nc$ of the solvent and $C$ is the concentration of the sample in the solvent in grams per 100 milliliters of solution.

EXAMPLE I

*Polymer of Allyl 2,3-Epoxycyclopentyl Ether*

To a Pyrex tube was charged 10.0 grams of allyl 2,3-epoxycyclopentyl ether and 2.0 cubic centimeters of a 25 percent by weight solution of acetyl peroxide in dimethyl phthalate. The tube was purged with nitrogen, sealed and rocked in a water bath at 50° C. for 130 hours. Additional heating at 150° C. for 89 hours produced a soft, sticky, amber colored polymer which was separated from the reaction mixture. The recovered polymer weighed 3 grams representing a 30 weight percent conversion and analyzed 67.2 percent carbon and 8.7 percent hydrogen. The theoretical analysis is 69 percent carbon and 7.9 percent hydrogen.

EXAMPLE II

*Cured Polymer of Allyl 2,3-Epoxycyclopentyl Ether*

A film was cast from an acetone solution of the polymer formed in Example I containing one weight percent phosphoric acid based on the homopolymer weight. The film was cured 20 minutes at 177° C., after which time it was found to be 60 percent insoluble in acetone at about room temperature.

EXAMPLE III

*Copolymer of Allyl 2,3-Epoxycyclopentyl Ether and Vinyl Chloride*

To a cold Pyrex tube was charged 5.0 grams of allyl 2,3-epoxycyclopentyl ether, 5.0 grams of vinyl chloride, 10.0 cubic centimeters of acetone and 1.0 cubic centimeter of a 25 weight percent solution of acetyl peroxide in dimethyl phthalate. The tube was purged with nitrogen, sealed, and rocked in a water bath at 50° C., for 6 hours. The recovered copolymer weighed 0.92 gram representing a 9.2 percent conversion and analyzed 72 weight percent poly(vinyl chloride). The copolymer had a reduced viscosity of 0.13 in cyclohexanone.

EXAMPLE IV

*Copolymer of Allyl 2,3-Epoxycyclopentyl Ether and Vinyl Chloride*

To a cold pressure bottle was charged 6.0 grams of allyl 2,3-epoxycyclopentyl ether, 24.0 grams of vinyl chloride, 0.5 gram of lauroyl peroxide, 15.0 cubic centimeters of a 9 percent aqueous solution of hydroxyethyl cellulose and 200.0 cubic centimeters of distilled water. The bottle was purged with nitrogen, capped and rotated end over end in a water bath at 45° C. for 25 hours. The recovered copolymer amounted to 2 grams representing about a 7 percent conversion and analyzed 75 weight percent of copolymerized vinyl chloride.

EXAMPLE V

*Copolymer of Allyl 2,3-Epoxycyclopentyl Ether and Vinyl Chloride*

To a cold Pyrex tube was charged 5.0 grams of allyl 2,3-epoxycyclopentyl ether, 15.0 grams of vinyl chloride, 10.0 grams of acetone and 1.0 cubic centimeter of a 25 weight percent solution of acetyl peroxide in dimethyl phthalate. The tube was purged with nitrogen, sealed, and rocked in a water bath at 50° C., for 10.7 hours. The recovered copolymer weighed 3.5 grams amounting to a 17 percent conversion and analyzed 83.4 weight percent of copolymerized vinyl chloride. The copolymer had a reduced viscosity of 0.19 in cyclohexanone.

EXAMPLE VI

*Cured Allyl 2,3-Epoxycyclopentyl Ether-Vinyl Chloride Copolymer*

A film was cast from a cyclohexanone solution of the copolymer produced in Example V containing one weight percent phosphoric acid based on the copolymer weight. The film was cured 20 minutes at 177° C., after which time it was found to be 78 percent insoluble in cyclohexanone at about room temperature.

EXAMPLE VII

*Copolymer of Allyl 2,3-Epoxycyclopentyl Ether and Vinyl Chloride*

To a cold pressure bottle was charged 3.0 grams of allyl 2,3-epoxycyclopentyl ether, 27.0 grams of vinyl chloride, 0.5 gram of potassium persulfate, 150.0 cubic centimeters of distilled water and 20.0 cubic centimeters of a 5 weight percent aqueous solution of the dioctyl ester of sodium sulfosuccinic acid. The bottle was purged with nitrogen, capped, and agitated in a water bath at 50° C., for 19 hours. The recovered copolymer amounted to 12 grams or a 40 percent conversion and analyzed 92.4 weight percent of copolymerized vinyl chloride. The copolymer had a reduced viscosity of 0.57 in cyclohexanone.

EXAMPLE VIII

*Cured Allyl 2,3-Epoxycyclopentyl Ether-Vinyl Chloride Copolymer*

A film was cast from a cyclohexanone solution of the copolymer formed in Example VII containing one percent phosphoric acid based on copolymer weight. The film was cured 20 minutes at 177° C., after which time it was 78 percent insoluble in cyclohexanone at about room temperature.

EXAMPLE IX

*Copolymer of Allyl 2,3-Epoxycyclopentyl Ether and Vinylidene Chloride*

A Pyrex tube was charged with 10.0 grams of allyl 2,3-epoxycyclopentyl ether, 10.0 grams of vinylidene chloride, 10.0 grams of acetone and 0.25 gram of acetyl peroxide. The tube was purged with nitrogen, sealed and rocked in a water bath at 50° C., for 20 hours. The recovered copolymer weighed 3 grams amounting to a 15 percent conversion and analyzed 79.4 weight percent copolymerized vinylidene chloride.

EXAMPLE X

*Cured Allyl 2,3-Epoxycyclopentyl Ether-Vinylidene Chloride Copolymer*

A film was cast from a cyclohexanone solution of the copolymer produced in Example IX containing one percent phosphoric acid based on copolymer weight. The film was cured 20 minutes at 177° C., after which time it was found to be 73 percent insoluble in cyclohexanone at about room temperature.

EXAMPLE XI

*Copolymerization of Allyl 2,3-Epoxycyclopentyl Ether and Vinyl Acetate*

To a Pyrex tube was charged 5.0 grams of allyl 2,3-epoxycyclopentyl ether, 5.0 grams of vinyl acetate and 1.0 cubic centimeter of a 25 weight percent solution of acetyl peroxide in dimethyl phthalate. The tube was purged with nitrogen, sealed and rocked in a water bath at 50° C., for 96 hours. The recovered copolymer amounted to 2 grams or a 20 percent conversion and analyzed 62.5 weight percent carbon and 7.9 weight percent hydrogen which corresponds to 48 percent copolymerized vinyl acetate.

EXAMPLE XII

*Cured Allyl 2,3-Epoxycyclopentyl Ether-Vinyl Acetate Copolymer*

A film was cast from a cyclohexanone solution of the copolymer formed in Example XI containing one percent phosphoric acid based on copolymer weight. The film was cured 20 minutes at 177° C., after which time it was found to be 54 percent insoluble in cyclohexanone at about room temperature.

EXAMPLE XIII

*Copolymer of Allyl 2,3-Epoxycylopentyl Ether and Ethyl Acrylate*

A Pyrex tube was charged with 14.0 grams of allyl 2,3-epoxycyclopentyl ether, 6.0 grams of ethyl acrylate, 10.0 grams of acetone and 1.0 cubic centimeter of a 25 weight percent solution of acetyl peroxide in dimethyl phthalate. The tube was purged with nitrogen, sealed and rocked in a water bath at 50° C., for 20 hours. The recovered copolymer amounted to 5 grams or a 25 percent conversion and analyzed 63.1 weight percent carbon and 8.4 weight percent hydrogen which corresponds to 65 weight percent as copolymerized ethylacrylate.

EXAMPLE XIV

*Cured Allyl 2,3-Epoxycyclopentyl Ether-Ethyl Acrylate Polymer*

A film was cast from a benzene solution of the copolymer produced in Example XIII containing one percent phosphoric acid based on copolymer weight. The film was cured 20 minutes at 177° C., after which time it was 40 percent insoluble in benzene at about room temperature.

EXAMPLE XV

*Copolymer of Allyl 2,3-Epoxycyclopentyl Ether and Methyl Methacrylate*

To a Pyrex tube was charged 7.5 grams of allyl 2,3-epoxycyclopentyl ether, 2.5 grams of methyl methacrylate and 1.0 cubic centimeter of a 25 weight percent solution of acetyl peroxide in dimethyl phthalate. The tube was purged with nitrogen, sealed and rocked in a water bath at 50° C., for 22.5 hours. The recovered copolymer amounted to 4.7 grams representing a 47 percent conversion and analyzed 60.5 weight percent carbon which corresponds to 94 weight percent copolymerized methyl methacrylate. The copolymer had a reduced viscosity of 0.19 in benzene.

EXAMPLE XVI

*Cured Allyl 2,3-Epoxycyclopentyl Ether-Methyl Methacrylate Copolymer*

A film was cast from a benzene solution of the copolymer formed in Example XV containing one percent phosphoric acid based on the copolymer weight. The film was cured 20 minutes at 177° C., after which time it was found to be 88 percent insoluble in benzene at about room temperature.

EXAMPLE XVII

*Copolymer of Allyl 2,3-Epoxycyclopentyl Ether and Acrylonitrile*

A Pyrex tube was charged with 15.0 grams of allyl 2,3-epoxycyclopentyl ether, 5.0 grams of acrylonitrile, 10.0 grams of acetone and 1.0 cubic centimeter of a 25 percent solution of acetyl peroxide in dimethyl phthalate. The tube was purged with nitrogen, sealed and rocked in a water bath at 50° C., for 36 hours. The recovered copolymer weighed 8 grams representing a 40 percent conversion and analyzed 46.5 weight percent copolymerized acrylonitrile. The copolymer had a reduced viscosity of 0.11 in dimethylformamide.

EXAMPLE XVIII

*Cured Allyl 2,3-Epoxycyclopentyl Ether-Acrylonitrile Copolymer*

A film was cast from a dimethylformamide solution of the copolymer of Example XVII containing one percent phosphoric acid based on the copolymer. The film was cured 20 minutes at 177° C., after which time it was 58 percent insoluble in dimethylformamide at about room temperature.

EXAMPLE XIX

*Copolymer of Allyl 2,3-Epoxycyclopentyl Ether and Chlorostyrene*

To a Pyrex tube was charged 15.0 grams of allyl 2,3-epoxycyclopentyl ether, 5.0 grams of chlorostyrene, 10.0 grams of acetone and 1.0 cubic centimeter of a 25 weight percent solution of acetyl peroxide in dimethyl phthalate. The tube was purged with nitrogen, sealed and rocked in a water bath at 50° C., for 36 hours. The recovered copolymer amounted to 4 grams or a 20 percent conversion and analyzed 96 weight percent copolymerized chlorostyrene. The copolymer had a reduced viscosity of 0.12 in benzene.

EXAMPLE XX

*Cured Allyl 2,3-Epoxycyclopentyl Ether-Chlorostyrene Copolymer*

A film was cast from a benzene solution containing the copolymer produced in Example XIX and one percent phosphoric acid based on the copolymer. The film was cured 20 minutes at 177° C., after which time it was 61 percent insoluble in benzene at about room temperature.

EXAMPLE XXI

*Copolymer of Allyl 2,3-Epoxycyclopentyl Ether, Vinyl Chloride and Acrylonitrile*

A cold Pyrex tube was charged with 6.0 grams of vinyl chloride, 2.0 grams of acrylonitrile, 2.0 grams of allyl 2,3-epoxycyclopentyl ether, 5.0 grams of acetone and 1.0 cubic centimeter of a 25 weight percent solution of acetyl peroxide in dimethyl phthalate. The tube was urged with nitrogen, sealed, and rocked in a water bath at 50° C., for 5.5 hours. The recovered copolymer amounted to 1.3 grams representing a 13 percent conversion and analyzed 37.5 weight percent copolymerized vinyl chloride, 59 weight percent copolymerized acrylonitrile and 3.5 weight percent of the copolymerized ether (by weight difference). The copolymer had a reduced viscosity of 0.51 in dimethylformamide.

EXAMPLE XXII

*Cured Allyl 2,3-Epoxycyclopentyl Ether-Vinyl Chloride-Acrylonitrile Copolymer*

A film was cast from a dimethylformamide solution of the copolymer formed in Example XXI and one percent phosphoric acid based on the copolymer weight. The film was cured 20 minutes at 177° C., after which time it was found to be 50 percent insoluble in dimethylformamide at about room temperature.

EXAMPLE XXIII

*Copolymer of Allyl 2,3-Epoxycyclopentyl Ether, Vinyl Chloride and Vinylidene Chloride*

A cold Pyrex tube was charged with 2.0 grams of vinylidene chloride, 6.0 grams of vinyl chloride, 2.0 grams of allyl 2,3-epoxycyclopentyl ether, 5.0 grams of acetone and 1.0 cubic centimeter of a 25 percent by weight solution of acetyl peroxide in dimethyl phthalate. The tube was flushed with nitrogen, sealed, and rocked in a water bath at 50° C. for 22.5 hours. The recovered copolymer amounted to 4 grams representing a 40 percent conversion and analyzed 47.5 percent chlorine by weight. The copolymer had a reduced viscosity of 0.12 in cyclohexanone.

EXAMPLE XXIV

*Cured Allyl 2,3-Epoxycyclopentyl Ether-Vinyl Chloride-Vinylidene Chloride Copolymer*

A film was cast from a cyclohexanone solution of the copolymer produced in Example XXIII and one percent by weight phosphoric acid based on the copolymer weight. The film was cured 20 minutes at 177° C. after which time it was found to be 70 percent insoluble in cyclohexanone at about room temperature.

EXAMPLE XXV

*Copolymer of Allyl 2,3-Epoxycyclopentyl Ether, Vinyl Chloride and Vinyl Acetate*

A cold Pyrex tube was charged with 2.0 grams of vinyl acetate, 6.0 grams of vinyl chloride, 2.0 grams of allyl 2,3-epoxycyclopentyl ether, 5.0 grams of acetone and 1.0 cubic centimeter of a 25 weight percent solution of acetyl peroxide in dimethyl phthalate. The tube was flushed with nitrogen, sealed and rocked in a water bath at 50° C. for 22.5 hours. The recovered copolymer amounted to 4 grams, representing a 40 percent conversion, and was analyzed as comprising 72.2 weight percent copolymerized vinyl chloride. The copolymer had a reduced viscosity of 0.21 in cyclohexane.

EXAMPLE XXVI

*Cured Allyl 2,3-Epoxycyclopentyl Ether-Vinyl Chloride-Vinyl Acetate Copolymer*

A film was cast from a solution of the copolymer formed in Example XXV in benzene containing one percent phosphoric acid, based on the copolymer weight. The film was cured for 20 minutes at 177° C., after which time it was found to be 72 percent insoluble in benzene at about room temperature.

What is claimed is:

1. A copolymer obtained by polymerizing a mixture of monomers comprising an epoxide of the formula:

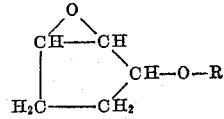

wherein R represents an alkenyl group containing from 2 through 4 carbon atoms and polymerizable compounds selected from the group consisting of vinyl chloride, acrylonitrile, methacrylonitrile, vinyl acetate, vinyl chloroacetate, vinylidene chloride, methyl acrylate, methyl methacrylate, ethyl acrylate, unsaturated aliphatic esters of saturated aliphatic polybasic acids, unsaturated aliphatic esters of unsaturated aliphatic polybasic acids, unsaturated esters of dibasic aromatic acids and chlorostyrene.

2. A copolymer obtained by polymerizing a mixture of vinyl chloride and allyl 2,3-epoxycyclopentyl ether.

3. A copolymer obtained by polymerizing a mixture of acrylonitrile and allyl 2,3-epoxycyclopentyl ether.

4. A copolymer obtained by polymerizing a mixture of vinyl acetate and allyl 2,3-epoxycyclopentyl ether.

5. A copolymer obtained by polymerizing a mixture of ethyl acrylate and allyl 2,3-epoxycyclopentyl ether.

6. A copolymer obtained by polymerizing a mixture of vinylidene chloride and allyl 2,3-epoxycyclopentyl ether.

7. A copolymer obtained by polymerizing a mixture of chlorostyrene and allyl 2,3-epoxycyclopentyl ether.

8. A copolymer obtained by polymerizing a mixture of allyl 2,3-epoxycyclopentyl ether, vinyl chloride and acrylonitrile.

9. A copolymer obtained by polymerizing a mixture of allyl 2,3-epoxycyclopentyl ether, vinyl chloride and vinyl acetate.

10. A copolymer obtained by polymerizing a mixture of allyl 2,3-epoxycyclopentyl ether, vinyl chloride and vinylidene chloride.

11. A copolymer obtained by polymerizing a mixture of allyl 2,3-epoxycyclopentyl ether, and methyl methacrylate.

References Cited in the file of this patent

UNITED STATES PATENTS

| | | |
|---|---|---|
| 2,260,753 | Marple et al. | Oct. 28, 1941 |
| 2,476,922 | Shokal et al. | July 19, 1949 |
| 2,633,458 | Shokal | Mar. 31, 1953 |
| 2,739,161 | Carlson | Mar. 20, 1956 |
| 2,752,269 | Condo | June 26, 1956 |
| 2,768,153 | Shokal | Oct. 23, 1956 |
| 2,864,804 | Shokal et al. | Dec. 16, 1958 |
| 2,866,472 | Condo | May 12, 1959 |

FOREIGN PATENTS

| | | |
|---|---|---|
| 660,377 | Great Britain | Nov. 7, 1951 |